(12) United States Patent
Gafni et al.

(10) Patent No.: US 10,826,822 B2
(45) Date of Patent: Nov. 3, 2020

(54) LABEL-BASED FORWARDING WITH ENHANCED SCALABILITY

(71) Applicant: Mellanox Technologies Ltd., Yokneam (IL)

(72) Inventors: Barak Gafni, Kfar Malal (IL); Benny Koren, Zichron Yaakov (IL); David Mozes, Yokneam Moshava (IL); Linor Nehab, Haifa (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 1395 days.

(21) Appl. No.: 14/634,842

(22) Filed: Mar. 1, 2015

(65) Prior Publication Data

US 2016/0156551 A1    Jun. 2, 2016

Related U.S. Application Data

(60) Provisional application No. 62/085,665, filed on Dec. 1, 2014.

(51) Int. Cl.
*H04L 12/723* (2013.01)
*H04L 12/707* (2013.01)

(52) U.S. Cl.
CPC .............. *H04L 45/50* (2013.01); *H04L 45/24* (2013.01)

(58) Field of Classification Search
CPC ......... H04L 45/24; H04L 45/50; H04L 45/02; H04L 45/30; H04L 45/04; H04L 45/60; H04L 45/302; H04L 45/28; H04L 45/22; H04L 45/306; H04L 45/34; H04L 45/38; H04L 45/54; H04L 45/48; H04L 45/745; H04L 45/566; H04L 45/507; H04L 45/00; H04L 45/36; H04L 2212/00; H04L 12/725; H04L 12/721; H04L 12/28; H04L 12/803;

(Continued)

(56) References Cited

U.S. PATENT DOCUMENTS

| 7,061,911 B2 | 6/2006 | Furuno |
| 7,088,718 B1 | 8/2006 | Srivastava |

(Continued)

OTHER PUBLICATIONS

U.S. Appl. No. 14/665,005, Office Action dated Nov. 18, 2016.

(Continued)

*Primary Examiner* — Un C Cho
*Assistant Examiner* — Rasha K Fayed
(74) *Attorney, Agent, or Firm* — Kligler & Associates Patent Attorneys Ltd

(57) ABSTRACT

A method for communication includes configuring a router to forward data packets in a network in accordance with MPLS labels appended to the packets. A group of two or more of the interfaces is defined as a multi-path routing group in a forwarding table within the router. A plurality of records are stored in an ILM in the router, corresponding to different, respective label IDs, all pointing to the set of the entries in the forwarding table that belong to the multi-path routing group. Upon receiving in the router an incoming data packet having a label ID corresponding to any given record in the plurality, one of the interfaces in the group is selected, responsively to the given record and to the set of the entries in the forwarding table to which the given record points, for forwarding the incoming data packet without changing the label ID.

24 Claims, 5 Drawing Sheets

(58) Field of Classification Search
CPC ... H04L 12/723; H04L 12/4633; H04L 69/22; H04L 47/125; H04L 47/122; H04L 47/12; H04L 67/1008; H04L 67/1014; H04L 67/1029; H04L 67/101; H04L 67/1031; H04L 67/1002; H04L 67/1027; H04W 28/20; H04W 16/28
USPC ....... 370/392, 400, 401, 229, 338, 252, 280, 370/335, 342, 347; 375/142, 146, 296; 455/442, 450
See application file for complete search history.

(56) References Cited

U.S. PATENT DOCUMENTS

| | | | |
|---|---|---|---|
| 7,260,079 | B1 | 8/2007 | Chapman et al. |
| 7,606,230 | B1* | 10/2009 | Cohen ............... H04L 45/00 370/392 |
| 8,014,317 | B1* | 9/2011 | Ghosh ............... H04L 45/745 370/254 |
| 2001/0021189 | A1* | 9/2001 | Shiota ............... H04L 45/00 370/389 |
| 2007/0133568 | A1* | 6/2007 | Qing ............... H04L 12/66 370/397 |
| 2007/0189265 | A1* | 8/2007 | Li ............... H04L 45/22 370/351 |
| 2010/0302935 | A1* | 12/2010 | Zhang ............... H04L 45/50 370/218 |
| 2012/0069745 | A1* | 3/2012 | Kini ............... H04L 45/28 370/252 |
| 2012/0163189 | A1* | 6/2012 | Allan ............... H04L 45/50 370/241.1 |
| 2014/0177638 | A1 | 6/2014 | Bragg et al. |
| 2014/0293786 | A1* | 10/2014 | Lin ............... H04L 47/17 370/235 |
| 2015/0109907 | A1* | 4/2015 | Akiya ............... H04L 45/507 370/229 |
| 2015/0146536 | A1* | 5/2015 | Minei ............... H04L 45/507 370/236 |
| 2016/0112316 | A1 | 4/2016 | Wang et al. |

OTHER PUBLICATIONS

Kompella et al., "The Use of Entropy Labels in MPLS Forwarding", Internet Engineering Task Force (IETF), RFC 6790, 25 pages, Nov. 2012.
Gafni et al., U.S. Appl. No. 14/705,003, filed May 6, 2015.
Le Faucheur et al., "Multi-Protocol Label Switching (MPLS) Support of Differentiated Services", Network Working Group, RFC 3270, 56 pages, May 2002.
Blake et al., "An Architecture for Differentiated Services", Network Working Group, RFC 2475, 36 pages, Dec. 1998.
IEEE 802.1Q, "IEEE Standard for Local and metropolitan area networks Virtual Bridged Local Area Networks", IEEE Computer Society, 303 pages, May 19, 2006.
IEEE 802.1Qbb, "IEEE Standard for Local and metropolitan area networks—Media Access Control (MAC) Bridges and Virtual Bridged Local Area Networks—Amendment 17: Priority-based Flow Control", IEEE Computer Society, 40 pages, Sep. 30, 2011.
Gafni et al., U.S. Appl. No. 14/665,005, filed Mar. 23, 2015.
Rosen et al., "Multiprotocol Label Switching Architecture", Network Working Group, Request for Comments 3031, 61 pages, Jan. 2001.
Rosen et al., "MPLS Label Stack Encoding", Network Working Group, Request for Comments 3032, 23 pages, Jan. 2001.
Fang et al., "MPLS-Based Hierarchical SDN for Hyper-Scale DC/Cloud draft-fang-mpls-hsdn-for-hsdc-00", IETF Internet-Draft, 24 pages, Oct. 27, 2014.
Fang et al., "SDN and MPLS for DC", Microsoft, 16 pages, Nov. 3, 2014.
Afanasiev et al., "MPLS in DC and inter-DC networks: the unified forwarding mechanism for network programmability at scale", 40 pages, SDN/MPLS 2014 International Conference, Nov. 2-5, 2014.

* cited by examiner

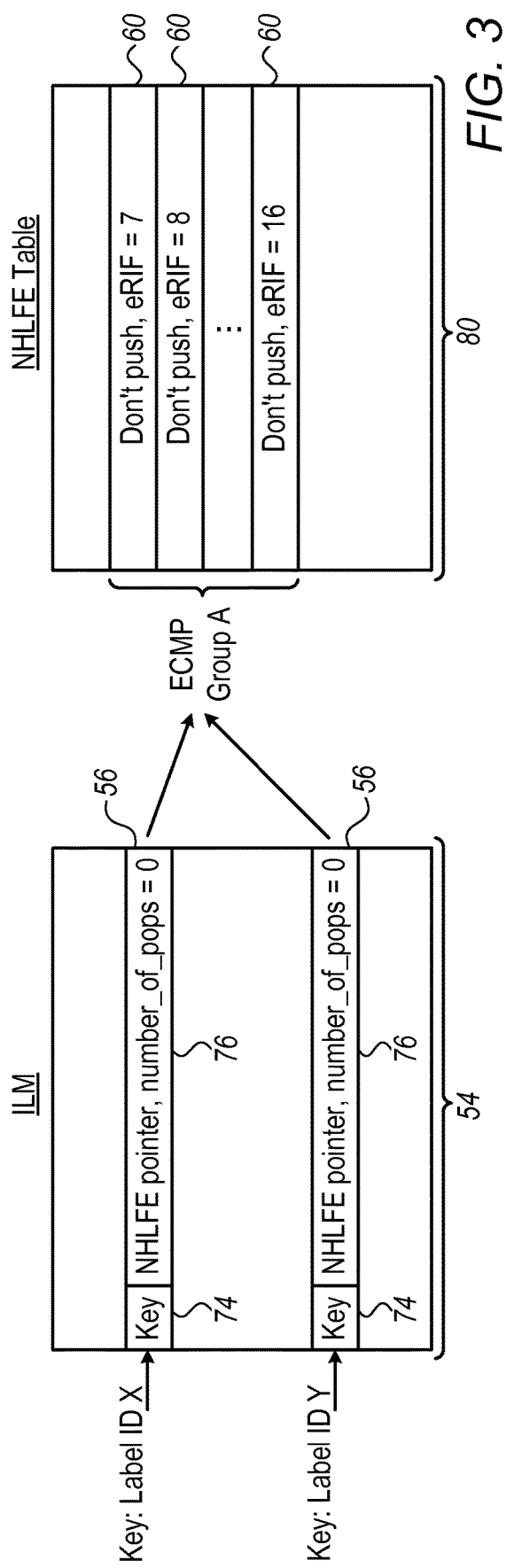
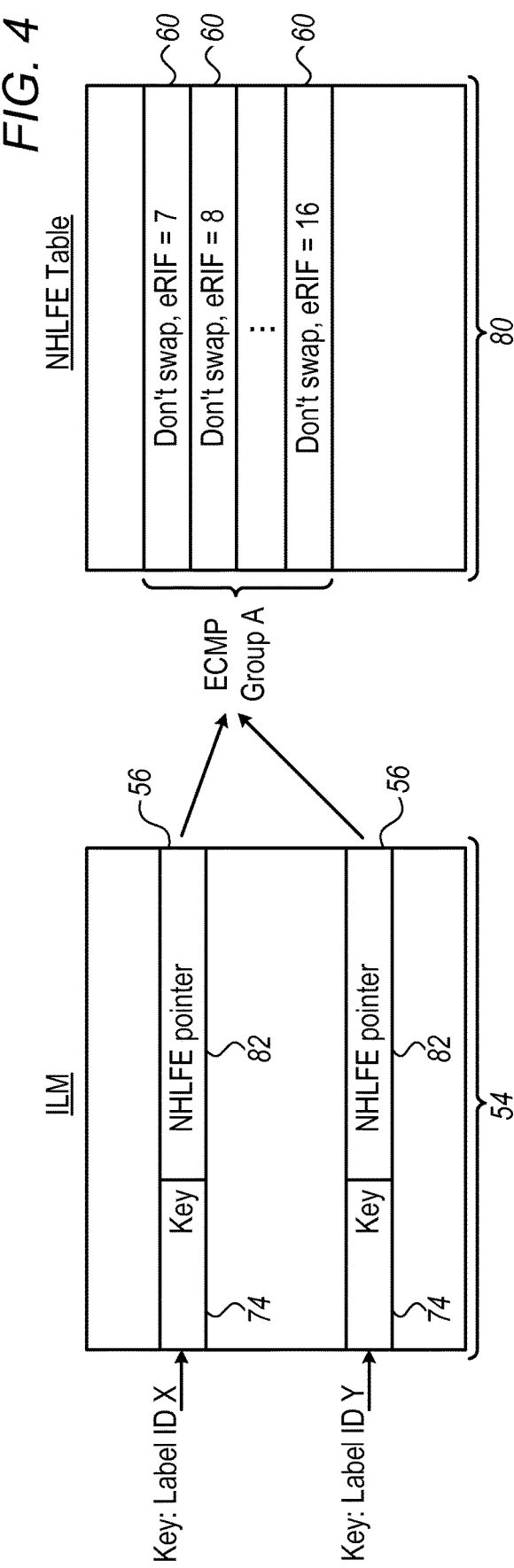

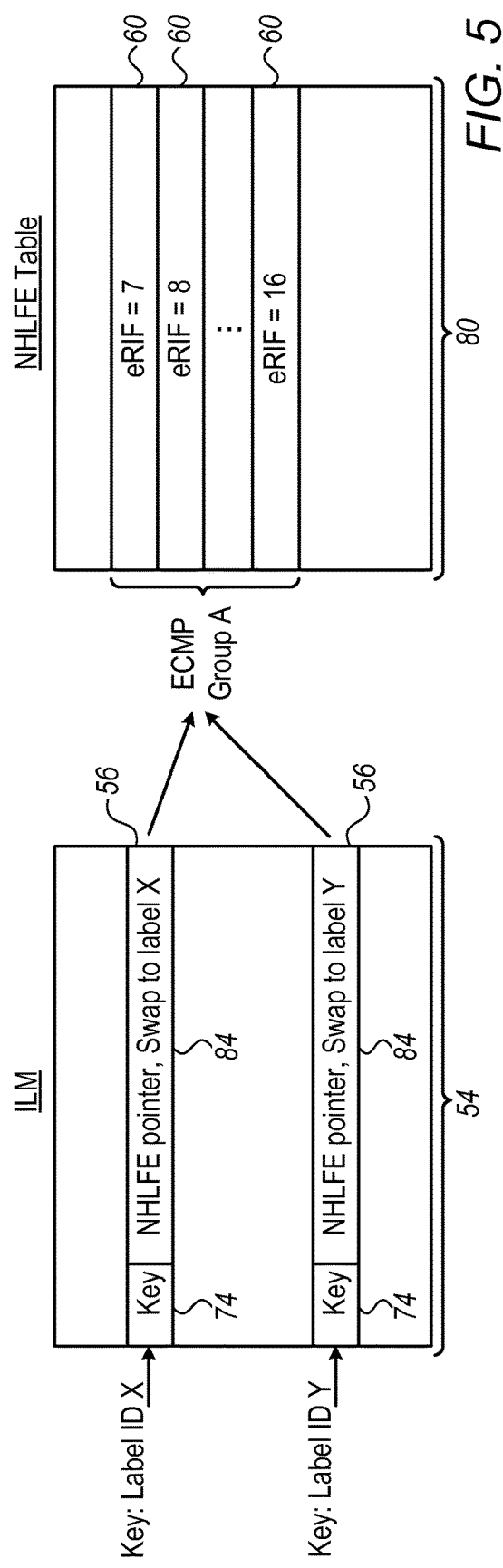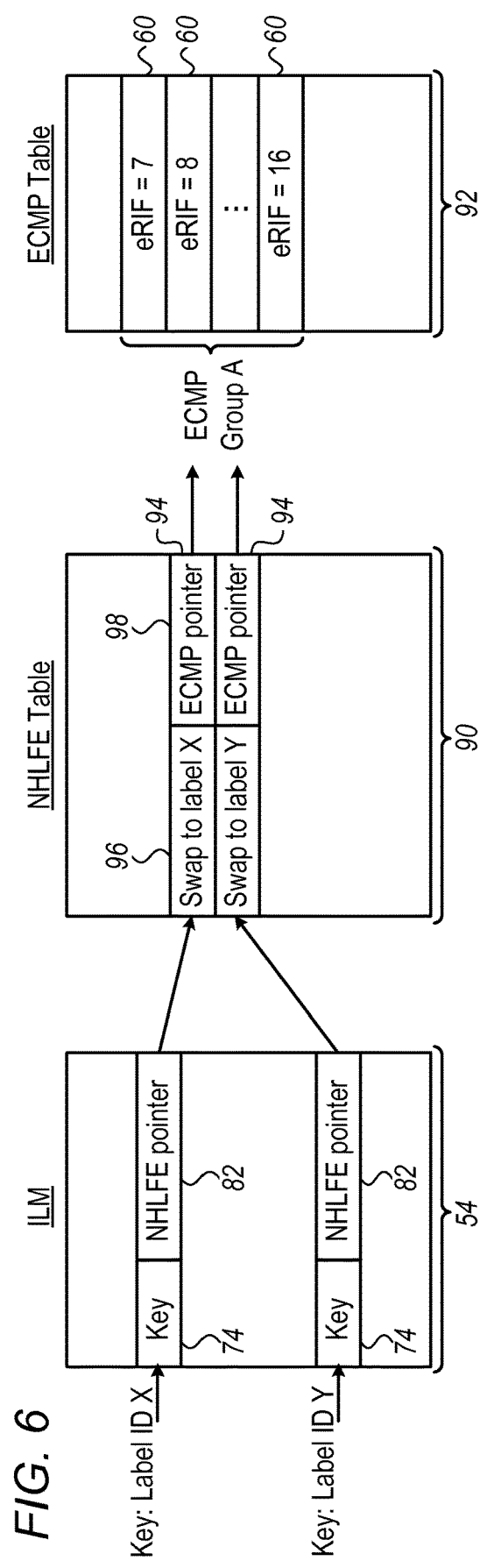
FIG. 5
FIG. 6

LABEL-BASED FORWARDING WITH ENHANCED SCALABILITY

CROSS-REFERENCE TO RELATED APPLICATIONS

This application claims the benefit of U.S. Provisional Patent Application 62/085,665, filed Dec. 1, 2014, which is incorporated herein by reference.

FIELD OF THE INVENTION

The present invention relates generally to computer networks, and specifically to routing and forwarding of data packets in such networks.

BACKGROUND

Multiprotocol Label Switching (MPLS) is a mechanism for packet routing that is widely used in high-performance computer networks. In an MPLS network, data packets are assigned labels, and packet-forwarding decisions are made solely on the contents of the labels, without the need to examine the network address of the packet itself. The MPLS architecture and label structure were originally defined by Rosen et al. in Requests for Comments (RFCs) 3031 and 3032 of the Internet Engineering Task Force (IETF) Network Working Group (2001), which are incorporated herein by reference.

MPLS is a network-layer protocol (Layer 3 in the Open Systems Interconnection [OSI] model), which is implemented by routers in place of or in addition to address-based routing. At the ingress to an MPLS network, a prefix is appended to the packet header, containing one or more MPLS labels. This prefix is called a label stack. According to RFC 3032, each label in the label stack contains four fields:

- A 20-bit label value (commonly referred to as the label identifier or "label ID").
- A 3-bit traffic class field for QoS (quality of service) priority and ECN (explicit congestion notification) signaling (also referred to as the "EXP" or traffic class—"TC"—field).
- A 1-bit bottom-of-stack flag, which is set to indicate that the current label is the last in the stack.
- An 8-bit TTL (time to live) field.

As explained in RFC 3031, any given router may use multiple different "label spaces," with different label spaces being associated with different interfaces of the router, for example, so that label IDs are unique only within their given label space. Therefore, the term "label ID," as used in the context of the present description and in the claims, should be understood to refer, where appropriate, to the couple (label space, label ID).

A router that routes packets based on these labels is called a label-switched router (LSR). According to RFC 3031, when an LSR receives a packet, it uses the label at the top of the stack in the packet header as an index to an Incoming Label Map (ILM). The ILM maps each incoming label to a set of one or more entries in a Next Hop Label Forwarding Entry (NHLFE) table. Each NHLFE indicates the next hop for the packet and an operation to be performed on the label stack. These operations may include replacing the label at the top of the stack with a new label, popping the label stack, and/or pushing one or more new labels onto the stack. After performing the required label stack operations, the LSR forwards the packet through the egress port indicated by the NHLFE.

Although it is sufficient, to comply with RFC 3031, that the ILM map each label to a single NHLFE, it is common practice to map a label to a set of multiple NHLFEs for purposes of load balancing. In this context, equal-cost multi-path (ECMP) routing is commonly used as a routing strategy, in which next-hop packet forwarding to a single destination can occur over multiple "best paths," which tie for top place in routing metric calculations. ECMP routing decisions are typically made per hop, by each router along the route of the packet through a network.

MPLS is being used increasingly in large-scale data center (DC) networks, such as the huge server networks used in supporting cloud computing services. In this regard, for example, Fang et al. describe the use of MPLS in hierarchical software-defined networks (SDN), in an internet draft entitled "MPLS-Based Hierarchical SDN for Hyper-Scale DC/Cloud," published as IETF Internet-Draft draft-fang-mpls-hsdn-for-hsdc-00 (Oct. 27, 2014). Hierarchical SDN (HSDN) is said to achieve massive network scale, including millions of endpoints, with "surprisingly small forwarding tables in the network nodes," while "efficiently handling both ECMP and any-to-any end-to-end Traffic Engineered (TE) traffic." The HSDN architecture constructs MPLS label stacks to identify network endpoints and forwards packets using the MPLS labels.

SUMMARY

Embodiments of the present invention that are described hereinbelow provide enhanced methods and apparatus for label-based routing and forwarding.

There is therefore provided, in accordance with an embodiment of the present invention, a method for communication, which includes configuring a router, having multiple interfaces connected to a network, to forward data packets in the network in accordance with Multiprotocol Label Switching (MPLS) labels appended to the data packets. A group of two or more of the interfaces is defined as a multi-path routing group, and a set of entries consisting of one respective entry for each of the interfaces in the group is stored in a forwarding table within the router. In an incoming label map (ILM) within the router, a plurality of records corresponding to different, respective label IDs contained in the MPLS labels are stored, such that all of the records in the plurality point to the set of the entries in the forwarding table that belong to the multi-path routing group. Upon receiving in the router an incoming data packet having a label ID corresponding to any given record in the plurality, one of the interfaces in the group is selected, responsively to the given record and to the set of the entries in the forwarding table to which the given record points, and the incoming data packet is forwarded through the one of the interfaces without changing the label ID.

In a disclosed embodiment, the set of the records is configured as an equal cost multi-path (ECMP) group within the forwarding table.

In some embodiments, defining the group includes defining at least first and second, different multi-path routing groups, and storing the plurality of the records includes defining different, first and second pluralities of the records, pointing to the entries in the forwarding table that belong respectively to the first and second multi-path routing groups.

Typically, forwarding the incoming data packet includes updating a time-to-live (TTL) field and/or a traffic class field in the label without changing the label ID.

In some embodiments, the forwarding table includes a Next Hop Label Forwarding Entry (NHLFE) table. In one embodiment, the plurality of the records in the ILM indicate that no labels should be popped from the incoming data packet, and the set of the entries in the NHLFE table indicate that no labels should be pushed onto the incoming data packet. In an alternative embodiment, the set of the entries in the NHLFE table indicate that a label at a top of a label stack in the incoming packet should not be swapped. Additionally or alternatively, the NHLFE table may contain further entries pointed to by one or more further records in the ILM that are outside the plurality and indicate that the labels of the data packets having label IDs corresponding to the further records should be swapped by the router.

In an alternative embodiment, the plurality of the records in the ILM indicate that an existing label at a top of a label stack in the incoming packet should be swapped with a new label having the same label ID as the existing label.

In a disclosed embodiment, each of the records in the plurality points to a respective entry in a Next Hop Label Forwarding Entry (NHLFE) table, which indicates that an existing label at a top of a label stack in the incoming packet should be swapped with a new label having the same label ID as the existing label, and which points to the set of the entries in the forwarding table that belong to the multi-path routing group.

In some embodiments, the label ID includes a label space.

There is also provided, in accordance with an embodiment of the present invention, packet routing apparatus, which includes multiple interfaces connected to a network and switching logic configured to transfer data packets among the interfaces. Packet processing logic is configured to cause the switching logic to forward the data packets in accordance with Multiprotocol Label Switching (MPLS) labels appended to the data packets. The packet processing logic includes a forwarding table, in which a group of two or more of the interfaces is defined as a multi-path routing group, and a set of entries is stored consisting of one respective entry for each of the interfaces in the group. The packet processing logic further includes an incoming label map (ILM), in which a plurality of records are stored corresponding to different, respective label IDs contained in the MPLS labels, such that all of the records in the plurality point to the set of the entries in the forwarding table that belong to the multi-path routing group. Upon receiving via one of the interfaces an incoming data packet having a label ID corresponding to any given record in the plurality, the packet processing logic selects, responsively to the given record and to the set of the entries in the forwarding table to which the given record points, one of the interfaces in the group, and causes the switching logic to forward the incoming data packet through the one of the interfaces without changing the label ID.

There is additionally provided, in accordance with an embodiment of the present invention, a method for communication, which includes configuring a router, having multiple interfaces connected to a network, to forward data packets in the network using Multiprotocol Label Switching (MPLS) labels appended to the data packets. A group of two or more of the interfaces is defined as a multi-path routing group, and a set of entries consisting of one respective entry for each of the interfaces in the group is stored in a forwarding table within the router. Upon receiving incoming data packets, the router looks up respective label IDs that are to be associated with the data packets to be forwarded from the router through the network, and maps the data packets to respective egress interfaces of the router, such that at least first and second data packets having different, respective first and second label IDs are mapped to the same multi-path routing group. The data packets are forwarded through the respective egress interfaces to which the data packets are mapped.

In some embodiments, looking up the respective label IDs includes reading and applying at least one label ID of an incoming data packet as a key in an incoming label map (ILM) within the router, and possibly reading and looking up in the ILM two or more label IDs contained in the incoming data packet. Additionally or alternatively, looking up the respective label IDs includes reading and applying one or more fields in a header of an incoming data packet or a traffic class field from a label of an incoming data packet as a key in an incoming label map (ILM) within the router.

The present invention will be more fully understood from the following detailed description of the embodiments thereof, taken together with the drawings in which:

BRIEF DESCRIPTION OF THE DRAWINGS

FIGS. 3-6 are block diagrams that schematically illustrate tables used in label-switched routing, in accordance with several embodiments of the present invention;

DETAILED DESCRIPTION OF EMBODIMENTS

Overview

Figure 1:
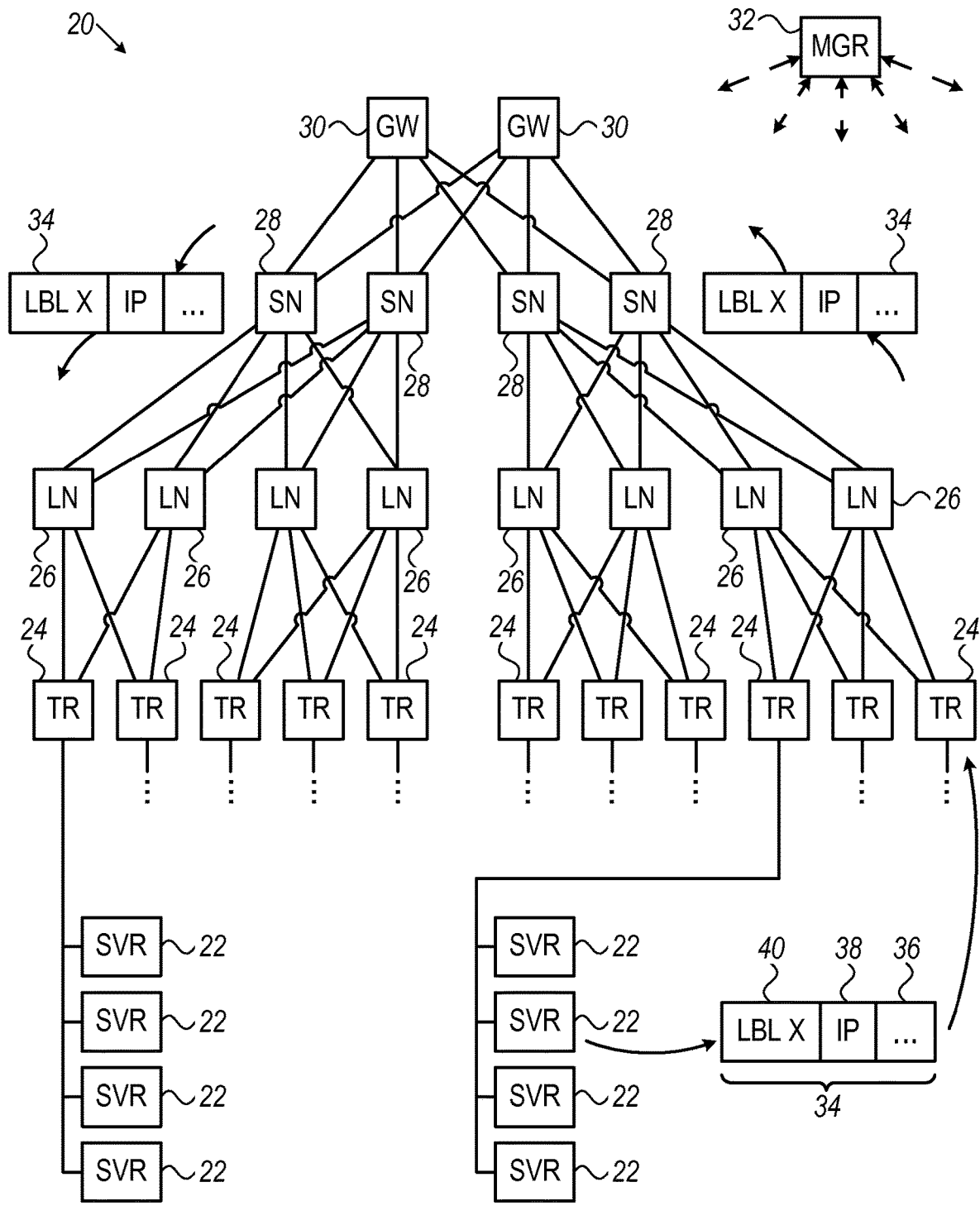
FIG. 1 is a block diagram that schematically illustrates a computer network, in accordance with an embodiment of the present invention.

In conventional MPLS implementations, labels are defined in a simple signaling procedure among neighboring routers, and each router along the path of a packet through the network swaps the label as it forwards the packet onward. As noted earlier, to implement ECMP forwarding (or other sorts of multi-path forwarding), each router may assign a group of entries in its NHLFE table to each label recorded in the ILM. Thus, the total number of entries in the NHLFE table will be approximately equal to the product of the number of label IDs in use by the router times the average size of the ECMP groups.

In large-scale data centers, routers are commonly arranged in a tightly-meshed topology, such as a hierarchical Clos or fat-tree topology, as are known in the art. In this setting, conventional implementations of MPLS lead to NHLFE tables that grow geometrically with network size, thus limiting network scalability.

Embodiments of the present invention that are described herein address this problem by breaking the accepted MPLS paradigm in two ways:

The routers in the network are configured to forward MPLS packets without label swapping, so that the same label ID may be maintained over the entire path (or a substantial segment of the path) of a packet through the network.

Since label-swapping is no longer required, the ILM and forwarding tables in the router can be configured so that multiple records in the ILM, corresponding to multiple, different label IDs, can all point to and thus share the same multi-path forwarding group.

These changes in handling of MPLS packets by routers in a network can be implemented by modifying either the hardware logic of the routers or the network management and control software that is used to configure and load the ILM and NHLFE tables in the routers, or by a combination of hardware and software modifications. As a result of these changes, the forwarding table need not be any larger than the ILM, and may be substantially smaller.

Thus, in the disclosed embodiments, a group of two or more interfaces in each MPLS router is configured as a multi-path routing group, and a set of entries consisting of one respective entry for each of the interfaces in the group is stored in a forwarding table within the router. Typically, the forwarding table is the NHLFE table, and the group of interfaces is defined as an ECMP group, but alternatively, other sorts of forwarding tables and multi-path forwarding schemes may be used. The ILM within the router stores a set of records corresponding to different, respective label IDs, but all pointing to the same set of entries in the forwarding table that belong to the multi-path routing group. The ILM may store multiple sets of records of this sort, each pointing to its own set of multi-path entries in the forwarding table.

When the router receives an incoming data packet having a label ID corresponding to any given record in this sort of set, packet processing logic in the router reads the record from the ILM. The logic uses the pointer in the record to access the corresponding set of entries in the forwarding table, selects one of the interfaces in the corresponding multi-path group, and instructs the switching logic in the router to forward the incoming data packet through this interface. Any suitable algorithm may be used in selecting the egress interface through which the packet is to be forwarded, including, for example, load balancing considerations, a hash computed over certain packet fields, or random choice. The label ID of the packet, however, remains unchanged.

System Description

FIG. 1 is a block diagram that schematically illustrates a computer network 20, in accordance with an embodiment of the present invention. Network 20 is arranged in a hierarchical, "fat tree" topology, as is commonly used in large-scale data centers, with multiple interconnections between nodes in successive levels of the hierarchy. This topology is shown here purely by way of example, however, to illustrate a typical operating environment in which MPLS forwarding is used, and the principles of the present invention may be applied in routers in substantially any multi-path Layer-3 network.

Network 20 comprises multiple computers, configured as servers 22 and arranged in racks, with a top-of-rack (TR) router 24 for each rack. Routers 24 are connected to leaf-node (LN) routers 26, which are connected in turn to spine-node (SN) routers 28 and thence to gateway (GW) routers 30. A network manager 32, typically comprising a computer with suitable software and interfaces for communication with the routers in network 20, configures the routers with appropriate label-handling and forwarding data to enable the routers to forward packets through the network on the basis of their MPLS labels, as explained below. In this context, the routers may be programmed to group some or all of their links to the routers in the adjacent levels of the network hierarchy as ECMP groups, so that packet load is balanced over the links. Manager 32 typically performs these label assignment and interface grouping functions under the control of software, which is stored on non-transitory media, such as optical, magnetic, or electronic memory media.

Routers 26, 28 and 30, and possibly routers 24, as well, are configured to forward data packets through network 20 without swapping the MPLS labels appended to the packets, and thus without changing the label ID from hop to hop. This non-swapping feature may be applied to all MPLS labels, or only to MPLS labels with certain label IDs, while other labels are swapped in the conventional manner. The feature may be implemented either by modifying the MPLS protocol signaling and software in manager 32 and the routers to add an option of forwarding without label swapping in the NHLFE tables, or by modifying the hardware and/or firmware of the routers themselves to carry out forwarding without label swapping on the basis of conventional MPLS signaling from manager 32. A number of these implementation options are illustrated in FIGS. 3-6.

The non-swapping treatment of MPLS labels in network 20 is illustrated in FIG. 1 by a packet 34 that is transmitted from a source server 22 to a destination server in another part of network 20. Packet 34 comprises, inter alia, a payload 36 header 38, such as an IP header, including the source and destination addresses of the packet. At least one MPLS label 40 is appended (or more specifically, prepended) to the packet, with label ID "X". In the pictured example, it is assumed that the network interface controllers (NICs) of servers 22 are configured apply the appropriate MPLS labels; but alternatively, the NICs may apply only headers 38, and MPLS labels 40 may be appended to the packets by routers 24 or 26.

Packet 34 is forwarded upward through the tiers of network 20 to gateway router 30. At each hop, label 40 is not swapped, and the label ID of the packet thus remains unchanged. The TTL field of the label, however, is decremented from hop to hop, and the traffic class field may also change in some cases. After reaching the gateway router, packet 34 is forwarded back down through the hierarchy to its destination. Alternatively, depending on the location of the destination server of the packet (as indicated by the MPLS label), one of routers 24, 26 or 28 on the upward route of the packet may forward the packet back down through the hierarchy to its destination rather than up to the next tier.

The present figures and the description, as well as the claims, refer for the sake of clarity and simplicity to handling of the label ID of packets forwarded through network 20, without relation to the label space. In many networks, only a single label space is used, so that forwarding does relate only to the label ID itself. For implementations that use more than a single label space, the term "label ID" should be understood to include by extension the couple (label space, label ID), which serves as the label ID in such implementations networks for purposes of table look-up and packet forwarding.

Figure 2:
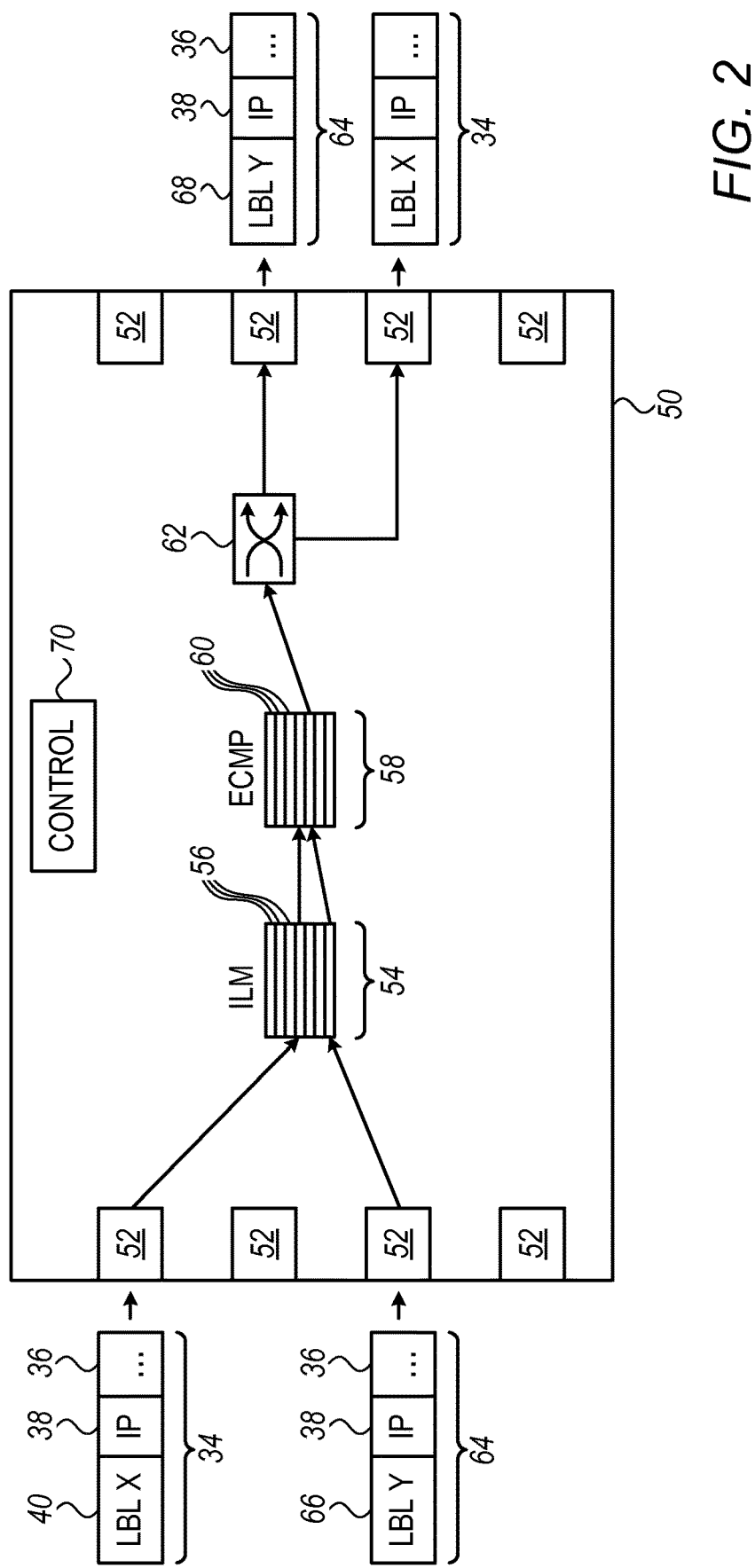
FIG. 2 is a block diagram that schematically illustrates a label-switched router, in accordance with an embodiment of the present invention.

FIG. 2 is a block diagram that schematically illustrates a label-switched router 50, in accordance with an embodiment of the present invention. Router 50 may be used in any of the tiers of network 20. For the sake of simplicity and clarity of illustration, FIG. 2 shows only the elements of router 50 that are directly relevant to an understanding of the present embodiments. Integration of these elements with the remaining components required for router operation will be apparent to those skilled in the art.

Router 50 comprises multiple interfaces 52 connected to network 20 and is generally capable of forwarding data packets 34, 64 from any ingress interface to any egress interface via switching logic 62, comprising a crossbar switch, for example. The switching and forwarding functions of router 50 are controlled by packet processing logic, which comprises an ILM 54, a forwarding table 58, and control logic 70, and handles the data packets in accordance with MPLS labels 40, 66 that are appended to the packets. Forwarding table 58 typically comprises an NHLFE table, as described hereinbelow. Alternatively, however, the NHLFE and multi-path forwarding functions of the router may be separated, as shown in FIG. 6, for example.

ILM 54 stores records 56 corresponding to different, respective label IDs contained in MPLS labels 40, 66 of incoming packets 34, 64. Thus, in the present example, ILM 54 will comprise separate records for the label IDs "X" and "Y" that are illustrated in the figure. Both of these records contain pointers to the same set of entries 60 in forwarding table 58. This set of entries defines a multi-path routing group, consisting of one respective entry 60 for each interface 52 in the group. Although only two different labels are shown in FIG. 2, in practice a much larger number of label IDs may be included in the multi-path routing group. For example, switch 50 may be programmed so that all of the labels in packets coming from a lower level in the hierarchy of network 20 that are to be passed up to the next level in the hierarchy belong to the same multi-path routing group. Additionally or alternatively, records 56 in ILM 54 may be mapped respectively to two or more different multi-path routing groups defined in forwarding table 58. Furthermore, at least some of records 56 in ILM 54 may be mapped to only a single entry 60 in the forwarding table, meaning that the size of the routing group is 1, and incoming packets with the corresponding label will always be forwarded through the same interface 52, corresponding to this single entry.

Returning to the example shown in FIG. 2, upon receiving incoming data packet 34 or 64, with a label ID whose record 56 in ILM 54 points to the multi-path routing group in forwarding table 58, control logic 70 selects one of entries 60 in the group to which the record points, and instructs switching logic 62 to forward the incoming data packet through the interface to the selected entry. Logic 70 may select the interface to use in each case on the basis of load-balancing considerations, using an ECMP algorithm for example, or alternatively, based on any other suitable selection criteria. Typically, as illustrated in the figure, the MPLS label is not swapped, so that for example, outgoing label 68 of packet 64 contains the same label ID as incoming label 66. Other fields of the label, however, such as the TTL field, may be updated. Not all incoming packets are necessarily treated in this manner, however, and thus for some label IDs, the ILM and/or NHLFE table in router 50 may instruct control logic 70 to swap the packet label in the conventional manner.

The figures that follow show certain configurations of the ILM and forwarding table in router 50 that may be used in implementing features of the present invention. These specific implementations are shown solely by way of example, however, and other implementations will be apparent to those skilled in the art after reading the present disclosure. All such implementations are considered to be within the scope of the present invention.

Methods of Table Configuration and Routing

FIG. 3 is a block diagram that schematically illustrates tables used in label-switched routing by router 50, in accordance with an embodiment of the present invention. In this embodiment (as well as the embodiments of FIGS. 4 and 5), NHLFE table 80 fulfills the role of forwarding table 58, as shown in FIG. 2. The logic in router 50 is typically modified, relative to routers that are known in the art, to support the novel routing functions that are described hereinbelow. The software interface for configuring the router may comprise application program interfaces (APIs) to enable the routing program to explicitly instruct the router logic to carry out these functions. For example, the router logic may be modified to support a new API command to "forward" packets with a certain label, in addition to the existing commands to pop, swap, and push packet labels.

Alternatively, the software may use existing APIs, while the router logic is configured to optimize the configuration and application of the tables as described herein. For example, the router logic may be configured to recognize label swap instructions in which the new label is identical to the incoming label, and implement such instructions automatically using one or more of the non-swapping table configurations and logical procedures described herein.

Further alternatively, the novel routing functions that are described herein may be implemented purely in software.

Specifically, for each record 56 in ILM 54, the label ID of the incoming packet serves as a key 74 to the record. Corresponding instructions 76 in each such record 56 point to the same group of entries 60 in NHLFE table 80 (marked as ECMP Group A), wherein each entry 60 points to a corresponding egress interface 52 in the group. In addition, instructions 76 indicate that no labels should be popped from the incoming data packet, and entries 60 in the NHLFE table indicate that no labels should be pushed onto the incoming data packet. The label ID of the top label and the label stack of the packet are thus unchanged in transit through router 50.

As noted earlier, although router 50 forwards incoming packets having certain label IDs in this manner without label swapping, the router is typically configured to perform conventional label swapping in forwarding other packets. For this purpose, NHLFE table 80 may contain further entries (not shown), which are pointed to by other records in ILM 54 that are keyed by other label IDs, and which indicate that the labels of the data packets having these label IDs should be swapped by the router. The tables shown in FIGS. 4-6 typically have similar sorts of entries, but these entries are omitted here for the sake of simplicity.

FIG. 4 is a block diagram that schematically illustrates tables used in label-switched routing by router 50, in accordance with another embodiment of the present invention. In this case, instructions 82 in records 56 in ILM 54 simply point to the appropriate ECMP group in NHLFE table 80. The corresponding entries 60 in the NHLFE table indicate that the label at the top of the label stack in the incoming packet should not be swapped. Control logic 70 in router 50 is configured in this case to perform routing operations and update the required packet fields without label swapping. Consequently, the label ID of the top label in the packet is unchanged in transit through the router.

FIG. 5 is a block diagram that schematically illustrates tables used in label-switched routing by router 50, in accordance with yet another embodiment of the present invention.

In this embodiment, instructions 84 in records 56 in ILM 54 indicate that the existing label at the top of the label stack in the incoming packet should be swapped with a new label having the same label ID ("X" or "Y" in the present example) as the existing label. In this respect, the router maintains formal compliance with existing MPLS standards, which call for label swapping at each hop. Control logic 70 is modified internally, however, relative to conventional routers, so that the "swap" to the same label is carried out without actually changing the label stack, other than updating the TTL field (and the traffic class field if necessary). Instructions 84 point to the multi-path group of entries 60 in NHLFE table 80, which simply point to the corresponding interfaces 52. Although this embodiment actually entails a label swap, this function is invoked in ILM 54, while ECMP forwarding is invoked separately in NHLFE table 80, thus preventing unnecessary duplications.

FIG. 6 is a block diagram that schematically illustrates tables used in label-switched routing by router 50, in accordance with an alternative embodiment of the present invention. Here the hardware of the router is modified, relative to most conventional label-switched routers, to include both an NHLFE table 90 and a separate forwarding table 92. This approach has the advantage that the number of entries 94 in NHLFE table 90 is equal to the number of ILM records, while the number of entries 60 in forwarding table 92 is roughly equal to the sum of the respective numbers of interfaces in the multi-path groups. Although this embodiment requires more table entries than the other embodiments described above, the total number of entries is still much lower than the product of the number of label IDs in use by the router times the average size of the ECMP groups.

For the set of incoming label IDs that are assigned to a given multi-path routing group, the records in ILM 54 comprise instructions 82 pointing to respective entries 94 in NHLFE table. Each entry 94 contains an instruction 96 to control logic 70 that the existing label at the top of the label stack in the incoming packet should be swapped by a new label having the same label ID as the existing label. (Alternatively, instructions 96 may simply indicate that no swap is to take place, if router 50 is configured to handle such instructions.) Each entry 94 also contains a pointer 98, which points to the set of entries 60 in forwarding table 92 that belong to the multi-path routing group.

Figure 7:
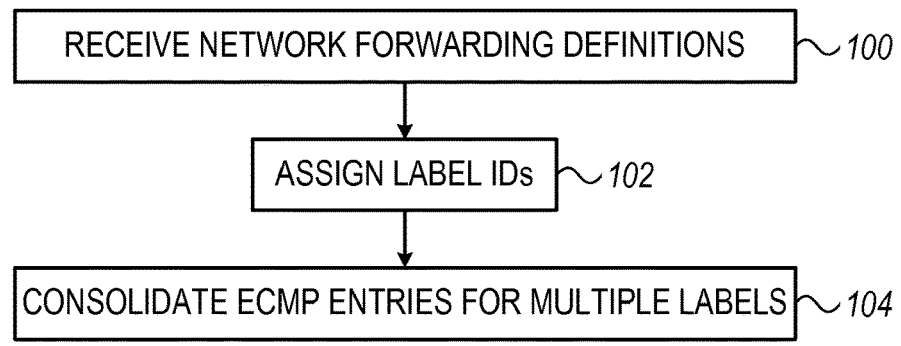
FIG. 7 is a flow chart that schematically illustrates a method for configuring labels and forwarding tables in a router, in accordance with an embodiment of the present invention.

FIG. 7 is a flow chart that schematically illustrates a method for configuring labels and forwarding tables in router 50, in accordance with an embodiment of the present invention. This method is typically carried out by network manager 32, under the control of suitable software, as noted above. Alternatively or additionally, at least some of the functions involved in the method of FIG. 7 may be carried out internally by the routers in network 20, if the routers are configured to do so.

Manager 32 receives network topology and configuration information, at a forwarding definition step 100. This information indicates the connectivity between the nodes in network 20 and the physical forwarding paths that are available. Based on the topology, manager 32 assigns MPLS label IDs to be applied by the nodes in the network, and generates corresponding label-swapping instructions, at a label assignment step 102. These instructions will include, in many or most cases, non-swapping of the label in transit through some or all of the routers between the source and destination servers 22. Thus, a given label may be associated in many or even all of the routers in network 20 with a given destination server or with a given branch of the network tree on which the destination server 22 is located.

Manager 32 generates and downloads corresponding ILM records and forwarding entries to the routers in network 20, at a table generation step 104. For the purposes of the forwarding entries, manager 32 reviews the label assignments and network topology in order to discover the label IDs in each router that share the same multi-path (ECMP) forwarding group. The manager consolidates the entries in the NHLFE table (or other forwarding table) and generates the corresponding ILM records so that the ILM instructions for label IDs with the same forwarding group all point to the same set of entries in the NHLFE. The ILM records and forwarding entries are downloaded in this form to the routers. The routers store and apply the routing information in the appropriate format in their internal tables, such as any of the formats shown in FIGS. 3-6, for example. If the NICs of servers 22 also support label generation, manager 32 may download the label assignments to the servers, as well.

Figure 8:
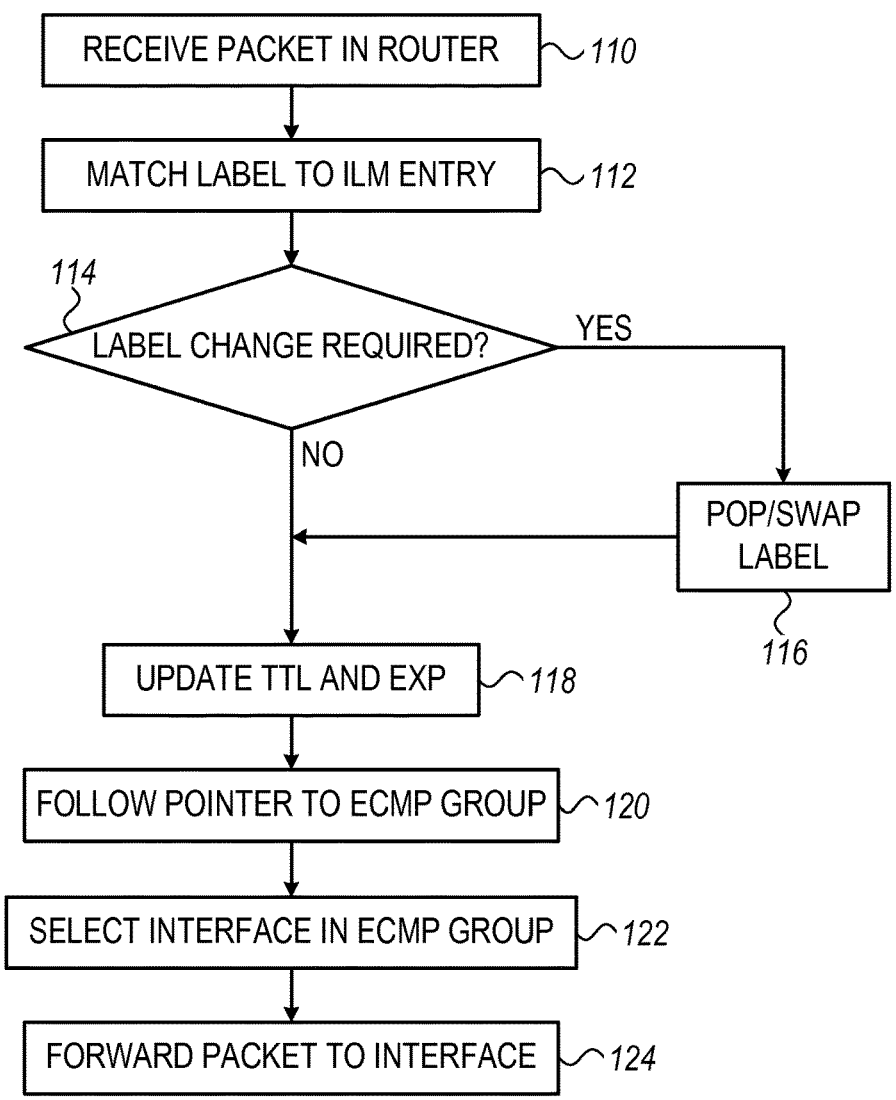
FIG. 8 is a flow chart that schematically illustrates a method for label-switched routing, in accordance with an embodiment of the present invention.

FIG. 8 is a flow chart that schematically illustrates a method for label-switched routing, in accordance with an embodiment of the present invention. The method is carried out by the routers in network 20 and is described hereinbelow, by way of example, with reference to router 50 (FIG. 2).

The method of FIG. 8 is initiated when the router receives an incoming packet, such as packet 34, from the network through one of interfaces 52, at a packet reception step 110. Control logic 70 matches the label ID in label 40, at the top of the label stack in packet 34, to one of records 56 in ILM 54, at a record matching step 112. As noted earlier, the label ID serves as the lookup key to the ILM. As noted earlier, when multiple different label spaces are used, the couple (label space, label ID) typically serves as the lookup key.

As another alternative, in some implementations control logic 70 may use multiple and/or other fields in the incoming packet as the lookup key. For example, logic 70 and ILM 54 may be configured so that two or more of the labels in an incoming packet are used together as a lookup key. Additionally or alternatively, other label fields, such as the traffic class field from the label of an incoming data packet, may be used as a key in ILM lookup. As a further alternative, the packet destination address and/or other header fields may be used in performing the ILM lookup. In all of these implementations, however, the handling of the ID lookup in the ILM is decoupled from identification of the multi-path routing group and selection of the egress interface through which the packet is to be forwarded.

Control logic 70 reads the instructions in the appropriate ILM record 56, and checks whether or not the instructions call for the top label to be swapped, at a swap checking step 114. Alternatively or additionally, the entry in the NHLFE table to which the ILM record points may contain label swapping (or non-swapping) instructions, as illustrated in the some of the embodiments shown in the preceding figures. In the event that the label ID is one for which label swapping is required, control logic 70 performs the steps that are mandated by the table entries, such as popping, pushing, or otherwise swapping the label at the top of the stack in packet 34, at a label swapping step 116. Otherwise, as in the embodiments shown above, no label swapping is performed.

Whether or not the label is swapped, control logic 70 updates certain fields of the top label, at a label update step 118. At this step, the TTL value in the label is decremented, and the traffic class (formerly known as "EXP") field is modified if called for by the forwarding instructions.

Control logic 70 follows the pointer in the chosen ILM record 56 (or possibly in the appropriate NHLFE table entry, as in the embodiment of FIG. 6) to identify the multi-path group through which packet 34 is to be forwarded, at a pointer resolution step 120. Within this group, the control logic chooses one interface 52 through which the packet is to be transmitted, at an interface selection step 122. As noted earlier, any suitable multi-path algorithm, such as ECMP algorithms that are known in the art, may be used at this step. Control logic 70 then instructs switching logic 62 to forward the packet through the selected interface, at a packet forwarding step 124. The packet is thus transmitted on to the next hop on its path.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
configuring a router, having multiple interfaces connected to a network, to forward data packets in the network in accordance with Multiprotocol Label Switching (MPLS) labels appended to the data packets;
defining a group of two or more of the interfaces as a multi-path routing group, and storing, in a forwarding table within the router, a set of entries consisting of one respective entry for each of the interfaces in the group;
storing, in an incoming label map (ILM) within the router, multiple records, each record including a label ID and a corresponding pointer to one or more entries in the forwarding table, wherein the multiple records include a plurality of records whose pointers point to the set of the entries in the forwarding table that belong to the multi-path routing group; and
upon receiving in the router an incoming data packet having a label ID corresponding to any given record in the plurality, selecting, responsively to the given record and to the set of the entries in the forwarding table to which the given record points, one of the interfaces in the group, and forwarding the incoming data packet through the one of the interfaces without changing the label ID.

2. The method according to claim 1, wherein the set of the records is configured as an equal cost multipath (ECMP) group within the forwarding table.

3. The method according to claim 1, wherein defining the group comprises defining at least first and second, different multi-path routing groups, and wherein storing the plurality of the records comprises defining different, first and second pluralities of the records, pointing to the entries in the forwarding table that belong respectively to the first and second multi-path routing groups.

4. The method according to claim 1, wherein forwarding the incoming data packet comprises updating a time-to-live (TTL) field in the label without changing the label ID.

5. The method according to claim 1, wherein forwarding the incoming data packet comprises updating a traffic class field in the label without changing the label ID.

6. The method according to claim 1, wherein the forwarding table comprises a Next Hop Label Forwarding Entry (NHLFE) table.

7. The method according to claim 6, wherein the plurality of the records in the ILM indicate that no labels should be popped from the incoming data packet, and the set of the entries in the NHLFE table indicate that no labels should be pushed onto the incoming data packet.

8. The method according to claim 6, wherein the set of the entries in the NHLFE table indicate that a label at a top of a label stack in the incoming packet should not be swapped.

9. The method according to claim 6, wherein the NHLFE table contains further entries pointed to by one or more further records in the ILM that are outside the plurality and indicate that the labels of the data packets having label IDs corresponding to the further records should be swapped by the router.

10. The method according to claim 1, wherein the plurality of the records in the ILM indicate that an existing label at a top of a label stack in the incoming packet should be swapped with a new label having the same label ID as the existing label.

11. The method according to claim 1, wherein each of the records in the plurality points to a respective entry in a Next Hop Label Forwarding Entry (NHLFE) table, which indicates that an existing label at a top of a label stack in the incoming packet should be swapped with a new label having the same label ID as the existing label, and which points to the set of the entries in the forwarding table that belong to the multi-path routing group.

12. The method according to claim 1, wherein the label ID comprises a label space.

13. Packet routing apparatus, comprising:
multiple interfaces connected to a network;
switching logic configured to transfer data packets among the interfaces; and
packet processing logic, which is configured to cause the switching logic to forward the data packets in accordance with Multiprotocol Label Switching (MPLS) labels appended to the data packets and comprises:
a forwarding table, in which a group of two or more of the interfaces is defined as a multi-path routing group, and a set of entries is stored consisting of one respective entry for each of the interfaces in the group; and
an incoming label map (ILM), in which a plurality of records are stored corresponding to different, respective label IDs contained in the MPLS labels, such that all of the records in the plurality point to the set of the entries in the forwarding table that belong to the multi-path routing group,
such that upon receiving via one of the interfaces an incoming data packet having a label ID corresponding to any given record in the plurality, the packet processing logic selects, responsively to the given record and to the set of the entries in the forwarding table to which the given record points, one of the interfaces in the group, and causes the switching logic to forward the incoming data packet through the one of the interfaces without changing the label ID.

14. The apparatus according to claim 13, wherein the set of the records is configured as an equal cost multipath (ECMP) group within the forwarding table.

15. The apparatus according to claim 13, wherein the forwarding table contains at least first and second, different multi-path routing groups, and wherein different, first and second pluralities of the records in the ILM point to the entries in the forwarding table that belong respectively to the first and second multi-path routing groups.

16. The apparatus according to claim 13, wherein the packet processing logic is configured to update a time-to-live (TTL) field in the label without changing the label ID.

17. The apparatus according to claim 13, wherein the packet processing logic is configured to update a traffic class field in the label without changing the label ID.

18. The apparatus according to claim 13, wherein the forwarding table comprises a Next Hop Label Forwarding Entry (NHLFE) table.

19. The apparatus according to claim 18, wherein the plurality of the records in the ILM indicate that no labels should be popped from the incoming data packet, and the set of the entries in the NHLFE table indicate that no labels should be pushed onto the incoming data packet.

20. The apparatus according to claim 18, wherein the set of the entries in the NHLFE table indicate that a label at a top of a label stack in the incoming packet should not be swapped.

21. The apparatus according to claim 18, wherein the NHLFE table contains further entries pointed to by one or more further records in the ILM that are outside the plurality and indicate that the labels of the data packets having label IDs corresponding to the further records should be swapped by the router.

22. The apparatus according to claim 13, wherein the plurality of the records in the ILM indicate that an existing label at a top of a label stack in the incoming packet should be swapped with a new label having the same label ID as the existing label.

23. The apparatus according to claim 13, wherein each of the records in the plurality points to a respective entry in a Next Hop Label Forwarding Entry (NHLFE) table, which indicates that an existing label at a top of a label stack in the incoming packet should be swapped with a new label having the same label ID as the existing label, and which points to the set of the entries in the forwarding table that belong to the multi-path routing group.

24. The apparatus according to claim 13, wherein the label ID comprises a label space.

\* \* \* \* \*